(12) United States Patent
Matsui

(10) Patent No.: US 7,409,479 B2
(45) Date of Patent: Aug. 5, 2008

(54) SEMICONDUCTOR INTEGRATED CIRCUIT (75) Inventor: Satoshi Matsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 586 days.

(21) Appl. No.: 11/155,623

(22) Filed: Jun. 20, 2005

(65) Prior Publication Data

US 2006/0218333 A1   Sep. 28, 2006

(30) Foreign Application Priority Data

Mar. 28, 2005   (JP)   ............... 2005-091782

(51) Int. Cl.
  *G06F 13/12*   (2006.01)
  *G06F 7/38*   (2006.01)
(52) U.S. Cl. .............. 710/66; 710/62; 710/65; 712/242
(58) Field of Classification Search ........... None
  See application file for complete search history.

(56) References Cited

U.S. PATENT DOCUMENTS 6,173,366 B1 *   1/2001   Thayer et al. ............... 711/129

FOREIGN PATENT DOCUMENTS

JP   2004-280924 A1   10/2004

* cited by examiner

*Primary Examiner*—Alan Chen
(74) *Attorney, Agent, or Firm*—Arent Fox LLP (57) ABSTRACT

When needing to make write accesses to both upper and lower sides of a counter in a timer, a CPU accesses the lower side last, and accesses the lower side first when needing to make read accesses thereto. The timer stores data of the data bus in the write buffer at the write access to the upper side, and writes the data of the data bus to the lower side and writes the data of the write buffer to the upper side at the write access to the lower side. At the read access to the lower side of the counter, the timer reads the data of the lower side for output to the data bus and reads the data of the upper side for storage in the read buffer. At the read access to the upper side, it outputs data of the read buffer to the data bus.

10 Claims, 7 Drawing Sheets

SEMICONDUCTOR INTEGRATED CIRCUIT

CROSS REFERENCE TO RELATED APPLICATION

This application is based upon and claims the benefit of priority from Japanese Patent Application No. 2005-091782, filed on Mar. 28, 2005, the entire contents of which are incorporated herein by reference.

BACKGROUND OF THE INVENTION

1. Field of the Invention

The present invention relates to a semiconductor integrated circuit and, more particularly, to an IP (Intellectual Property) macro re-used to improve the design efficiency of a system LSI or the like.

2. Description of the Related Art

Recently, CPUs have been configured in a multi-bit structure in order to cope with high-speed and high-performance of a system LSI. For example, if data input/output of a CPU is expanded from an 8-bit to a 16-bit type, then a data bus is also changed from an 8-bit to a 16-bit type. Meanwhile, an IP macro having an internal register expanded from an 8-bit type to a 16-bit type is required to be connectable not only to an 8-bit data bus but to a 16-bit data bus so as to improve the reusability.

For example, a case of expanding a counter in the IP macro (timer or the like) from an 8-bit to a 16-bit type will be described. To allow for an 8-bit CPU to obtain a counter value of a 16-bit counter via an 8-bit data bus, the 8-bit CPU needs to access both upper and lower sides of the 16-bit counter. However, if data of the upper side and lower side (both of which are a length of 8 bits) of the 16-bit counter are read at different timings, the 8-bit CPU cannot obtain the counter value of the 16-bit counter correctly. To solve such a problem, a typically employed method is that a 16-bit buffer is first installed in the IP macro to simultaneously store the data of the upper and lower sides during the 16-bit counter in counting operation and then read the data from the 16-bit buffer by every 8 bits. The above-mentioned method is also applied to a case where the 8-bit CPU sets a counter value of the 16-bit counter via the 8-bit data bus.

In addition, Japanese Unexamined Patent Application Publication No. 2004-280924 discloses a memory test circuit capable of testing a memory having a data width larger than a data bus of a CPU without increasing the number of test cycles.

In the above-mentioned method, however, because read data from the 16-bit counter or write data to the 16-bit counter is temporarily stored in the 16-bit buffer, the IP macro having the 16-bit counter may not operate at a same timing as the IP macro which is yet expanded to a 16-bit type (i.e., IP macro having the 8-bit counter). Consequently, a test pattern with respect to the IP macro, which is not yet expanded to a 16-bit type, cannot be employed to the IP macro expanded to the 16-bit type. As a result, a new test pattern has to be created for the IP macro expanded to the 16-bit type. Further, there is a problem in the above-mentioned method in that both of the upper and lower sides of the 16-bit counter need be always accessed even if only the lower side of the 16-bit counter need be accessed, resulting in a waste of time.

SUMMARY OF THE INVENTION

An object of the invention is to make it possible to employ a test pattern of an IP macro having an internal register with the same data width as that of a data bus, to test the IP macro having an internal register with a data width larger than the data bus.

In a semiconductor integrated circuit according to an aspect of the invention, a bus master performs an access operation in the same data width as a data bus. A register in a macro block has a data width larger than the data bus. A lower side of the register is connected to the data bus. A write buffer in the macro block stores therein write data to an upper side of the register. A read buffer in the macro block stores therein read data from the lower side of the register. The bus master accesses the lower side of the register when needing to make write accesses to the upper and lower sides of the register last, and accesses the lower side of the register first when needing to make read accesses to the upper and lower sides of the register. The macro block stores data of the data bus in the write buffer in response to write access of the bus master to the upper side of the register. The macro block writes data of the data bus to the lower side of the register and writes the data of the write buffer to the upper side of the register in response to write access of the bus master to the lower side of the register. When there is a need to make write accesses to the upper and lower sides of the register, it can write data having a data width larger than the data bus to the register at the same timing since the bus master accesses the upper side of the register and then accesses the lower side of the register. Also, the macro block reads the data of the lower side of the register and outputs it to the data bus and reads the data of the upper side of the register and stores it in the read buffer in response to read access of the bus master to the lower side of the register. The macro block outputs the data of the read buffer to the data bus in response to read access to the upper side of the register. When there is a need to make read accesses to the upper and lower sides of the register, it can obtain the data read from the register at the same timing (where the data has a data width larger than the data bus) since the bus master accesses the lower side of the register and then the upper side thereof.

In the semiconductor integrated circuit thus configured, since the lower side of the register is directly connected to the data bus, access of the bus master to only the lower side of the register can be performed at the same timing as the macro block having a register with the same data width as the data bus. Accordingly, it is possible to employ an existing test pattern with respect to a macro block having a register with the same data width as a data bus to test a macro block having a register with a data width larger than the data bus. That is, a test pattern can be commonly applied to a macro block having a register with the same data width as a data bus and a macro block having a register with a data width larger than a data bus. Also, when there is a need to access only the lower side of the register, it is not necessary to access both the upper and lower sides of the register, thereby preventing a waste of time.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

In a preferred example of the semiconductor integrated circuit according to the above-mentioned aspect of the invention, a combined buffer in the macro block function as both of write and read buffers. That is, the combined buffer functions as a write buffer upon write access of a bus master to a register, and functions as a read buffer upon read access of the bus master to the register. Consequently, it is possible to reduce the circuit scale of the macro block compared to providing both the write and read buffers. Also, since the write and read accesses of the bus master are not simultaneously made, the access operation of the bus master to the register can be normally performed even though the combined buffer is provided instead of the write and read buffers.

In a preferred example of the semiconductor integrated circuit according to the above-mentioned aspect of the invention, the macro block includes a plurality of registers. A write buffer of the macro block is commonly provided to the plurality of registers. Similarly, a read buffer of the macro block is commonly provided to the plurality of registers. For example, when the macro block includes two registers A and B, the write buffer functions as a write buffer corresponding to the register A upon write access of a bus master to the register A, and functions as a write buffer corresponding to the register B upon write access of the bus master to the register B. Similarly, the read buffer functions as a read buffer corresponding to the register A upon read access of the bus master to the register A, and functions as a read buffer corresponding to the register B upon read access of the bus master to the register B. Consequently, it is possible to reduce the circuit scale of the macro block compared to providing both the write and read buffers to each of the registers A and B. Also, since accesses of the bus master to the registers A and B are not simultaneously made, the access operation of the bus master to the registers A and B can be normally performed even though the write and read buffers are commonly provided to the registers A and B.

In a preferred example of the semiconductor integrated circuit according to the above-mentioned aspect of the present invention, a combined buffer in the macro block function as write and read buffers commonly provided to a plurality of registers. That is, upon write access of a bus master to one of the plurality of register, the combined buffer function as a write buffer corresponding to the one of the plurality of registers accessed, and upon read access of the bus master to one of the plurality of register, the combined buffer function as a read buffer corresponding to the one of the plurality of registers accessed. Consequently, it is possible to reduce the circuit scale of the macro block compared to providing both the write and read buffers commonly to each of the plurality of registers. Also, since the write and read accesses of the bus master are not simultaneously made, even though the combined buffer is provided instead of both the write and read buffers provided to each of the plurality of register, the access operation of the bus master to the register can be normally performed.

In a preferred example of the semiconductor integrated circuit according to the above-mentioned aspect of the present invention, a first storing circuit in the macro block indicates whether or not a bus master has made write access to an upper side of a register. A second storing circuit in the macro block indicates either logic 1 or logic 0. A selection circuit in the macro block selects and outputs data of a write buffer when the first storing circuit indicates that write access has been made. When the first storing circuit indicates that no write access has been made, the selection circuit selects a first reserve data of which all bits indicate logic 1 or a second reserve data of which all bits indicate logic 0 according to a logic indicated by the second storing circuit and outputs the selected reserve data as data of the write buffer. Thus, when the bus master makes write access to the lower side rather than the upper side of the register, it is possible to determine data to be written to the upper side of the register. Accordingly, in a test of making the macro block perform a desired operation, it is possible to prevent different data from being written to the upper side of the register each time the test is performed, thereby allowing the macro block to perform a desired operation each time.

In a preferred example of the semiconductor integrated circuit according to the above-mentioned aspect of the present invention, a second storing circuit in the macro block is a register accessed by a bus master. Thus, a logic indicated by the second storing circuit can be set by write access of the bus master. Accordingly, when the bus master makes write access to only the lower side of the register rather than the upper side of the register, data to be written to the upper side of the register can be changed according to the type or use of the register.

In a preferred example of the semiconductor integrated circuit according to the above-mentioned aspect of the present invention, a register in the macro block function as a counter. A first storing circuit in the macro block indicates whether or not the bus master has made write access to an upper side of the register. A second storing circuit in the macro block indicates a count direction of the register (i.e., the counter). A selection circuit in the macro block selects and outputs data of a write buffer when the first storing circuit indicates that write access has been made. When the first storing circuit indicates that no write access has been made, the selection circuit selects a first reserve data of which all bits indicate logic 1 or a second reserve data of which all bits indicate logic 0 according to a count direction indicated by the second storing circuit and outputs the selected reserve data as data of the write buffer. For example, in a case where the first storing circuit indicates that no write access has been made, the selection circuit in the macro block selects the first reserve data when the second storing circuit indicates that the register is counting up, and selects the second reserve data when the second storing circuit indicates that the register is counting down.

Thus, when the bus master makes write access to only the lower side of the counter rather than the upper side of the counter, the first reserve data is written to the upper side of the counter when the counter counts up, and the second reserve data is written to the upper side of the counter when the counter counts down. Consequently, the counter having a data width larger than the data bus can be operated similarly to the counter having the same data width as the data bus. Accordingly, although a register function as a counter, it is unnecessary to change an existing test pattern.

In a preferred example of the semiconductor integrated circuit according to the above-mentioned aspect of the present invention, a first storing circuit makes a transition into a state indicating that write access has been made when a bus master accesses an upper side of a register, and makes a transition into a state indicating that no write access has been made when the bus master accesses a lower side of the register. Accordingly, when the bus master makes write access to only the lower side rather than the upper side of the register, it is possible to prevent data of the write buffer from being erroneously written to the upper side of the register.

Figure 1:
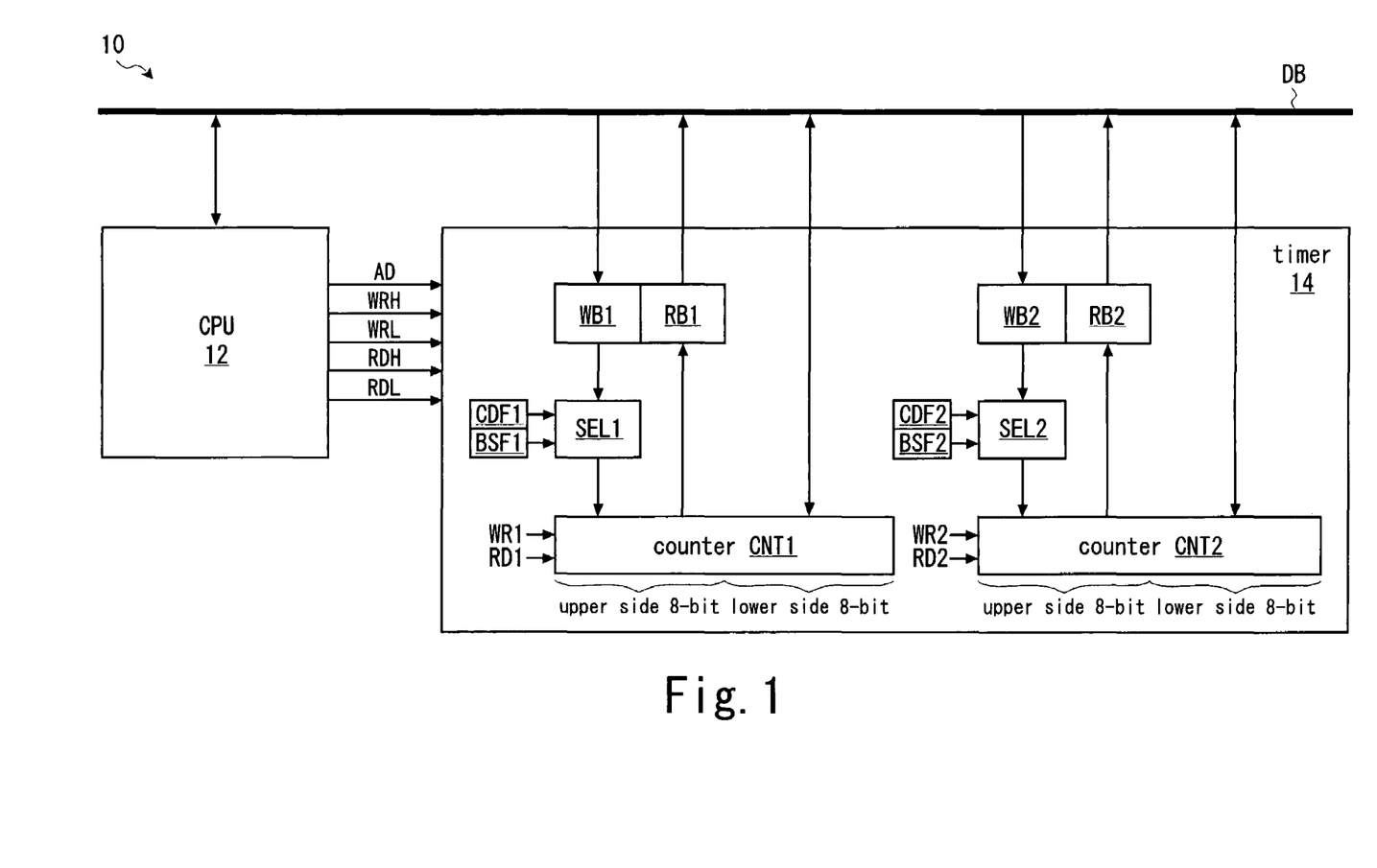
FIG. 1 is a block diagram showing a first embodiment of the invention.

Preferred embodiments of the invention will now be described with reference to the drawings. FIG. 1 shows a first embodiment of the invention. A system LSI 10 (semiconductor integrated circuit) includes a CPU 12 (bus master) having an 8-bit data input/output, a timer 14 (macro block), and an 8-bit data bus DB. The data bus DB interconnects the CPU 12 and the timer 14 and allows the data transfer therebetween.

When the CPU 12 makes write access to an upper side (8-bit) of a 16-bit up/down counter CNTn (n=1, 2) in the timer 14, it sets an address signal AD to a level indicating an address assigned to the upper side of the counter CNTn and at the same time activates a write signal WRH. Also, when the CPU 12 makes write access to a lower side (8-bit) of the counter CNTn in the timer 14, it sets the address signal AD to a level indicating an address assigned to the lower side of the counter CNTn and at the same time activates a write signal WRL. The CPU 12 outputs a desired write data to the data bus DB during activation of the write signal WRH or WRL.

When the CPU 12 makes read access to an upper side of a counter CNTn in the timer 14, it sets an address signal AD to a level indicating an address assigned to the upper side of the counter CNTn and at the same time activates a read signal RDH. Also, when the CPU 12 makes read access to a lower side of the counter CNTn in the timer 14, it sets the address signal AD to a level indicating an address assigned to the lower side of the counter CNTn and at the same time activates a read signal RDL. The CPU 12 acquires data of the data bus DB (i.e., read data outputted from the timer 14) during activation of the read signal RDH or RDL.

When the CPU 12 needs to make write access both to the upper side and to the lower side of the counter CNTn in the timer 14 (i.e., when it needs to make write access to the counter CNTn in a 16-bit mode), it accesses the upper side and in turn accesses the lower side. Also, when the CPU 12 needs to make read access both to the upper side and to the lower side of the counter CNTn in the timer 14 (i.e., when it needs to make read access to the counter CNTn in a 16-bit mode), it accesses the lower side and in turn accesses the upper side.

The timer 14 includes write buffers WBn, buffer status flags BSFn (first storing circuits), count direction flags CDFn (second storing circuits), selector circuits SELn (selection circuits), 16-bit up/down counters CNTn, and read buffers RBn. When the address signal AD indicates the address of the upper side of the counter CNTn and the write signal WRH is activated, the write buffer WBn takes data of a data bus DB (i.e., write data outputted from the CPU 12) and outputs the data to the selector circuit SELn.

The buffer status flag BSFn is set when the address signal AD indicates an address of an upper side of the counter CNTn and the write signal WRH is activated. In other words, the buffer status flag BSFn is set in response to write access of the CPU 12 to the upper side of the counter CNTn (data acquisition through the write buffer WBn). Also, the buffer status flag BSFn is reset when the address signal AD indicates an address of the lower side of the counter CNTn and the write signal WRL is activated. In other words, the buffer status flag BSFn is reset in response to write access of the CPU 12 to the lower side of the counter CNTn (data acquisition through the counter CNTn). Accordingly, the buffer status flag BSFn represents whether there is write access of the CPU 12 to the upper side of the counter CNTn or not.

The count direction flag CDFn is set when the counter CNTn counts up. Also, the count direction flag CDFn is reset when the counter CNTn counts down. Accordingly, the count direction flag CDFn represents a count direction of the counter CNTn. The selector circuit SELn selects data to be outputted to the counter CNTn (the upper side) according to set/reset of the buffer status flag BSFn and the count direction flag CDFn. The selector circuit SELn will be described in detail with reference to FIG. 2.

During activation of the internal write signal WRn, the counter CNTn takes data outputted from the selector circuit SELn on the upper side and takes data of the data bus DB (i.e., write data outputted from the CPU 12) on the lower side. Also, the internal write signal WRn is activated when the address signal AD represents the address of the lower side of the counter CNTn and the write signal WRL is activated. Also, during activation of the internal read signal RDn, the counter CNTn outputs the data of the upper side to the read buffer RDn and at the same time outputs the data of the lower side to the data bus DB. Also, the internal read signal RDn is activated when the address signal AD represents the address of the lower side of the counter CNTn and the read signal RDL is activated.

The read buffer RBn takes data outputted from the lower side of the counter CNTn when the address signal AD represents the address of the lower side of the counter CNTn and the read signal RDL is activated. The read buffer RBn outputs the data to the data bus DB when the address signal AD represents the address of the upper side of the counter CNTn and the read signal RDH is activated.

Figure 2:
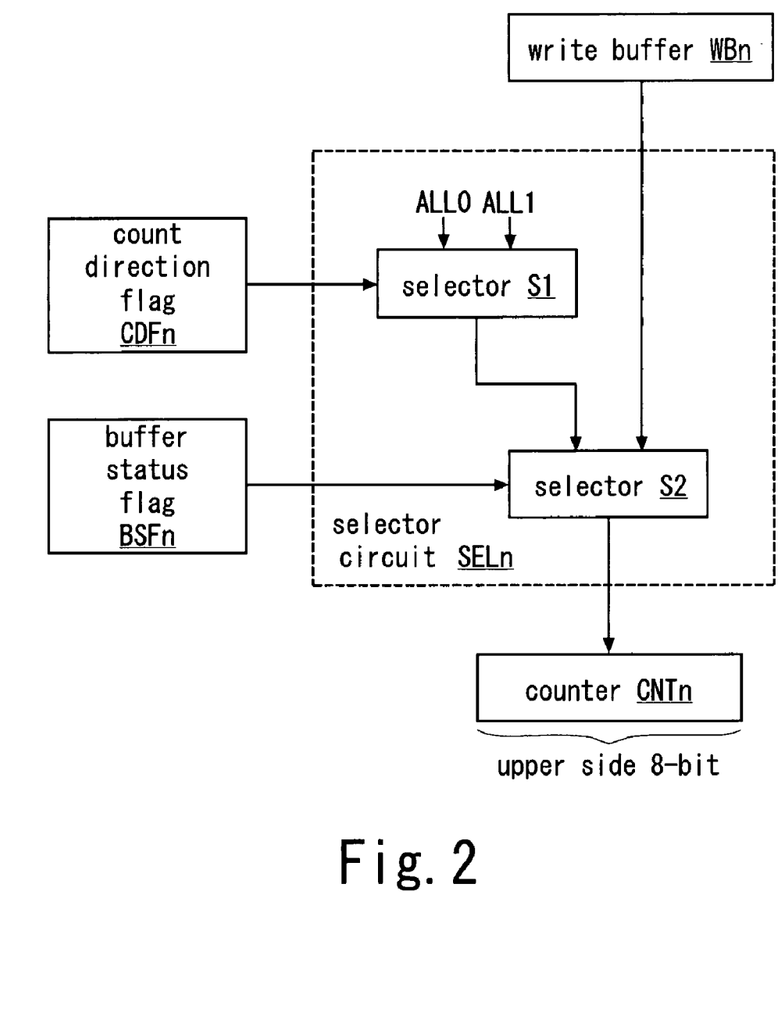
FIG. 2 is a block diagram showing a selector circuit in accordance with the first embodiment in detail.

FIG. 2 shows the selector circuit SELn in the first embodiment. The selector circuit SELn includes selectors S1 and S2. The selector S1 selects and outputs 8-bit data ALL1 (first reserve data) when the count direction flag CDFn is set (i.e., the counter CNTn counts up). The data ALL1 is one of which all bits indicate "logic 1". Also, the selector S1 selects and outputs 8-bit data ALL0 (second reserve data) when the count direction flag CDF1 is reset (i.e., the counter CNTn counts down). The data ALL0 is one of which all bits indicate "logic 0". The selector S2 selects and outputs output-data of the write buffer WBn to the counter CNTn when the buffer status flag BSFn is set. The selector S2 selects and outputs output-data of the selector S1 (either data ALL1 or ALL0) to the counter CNTn when the buffer status flag BSFn is reset.

Figure 3:
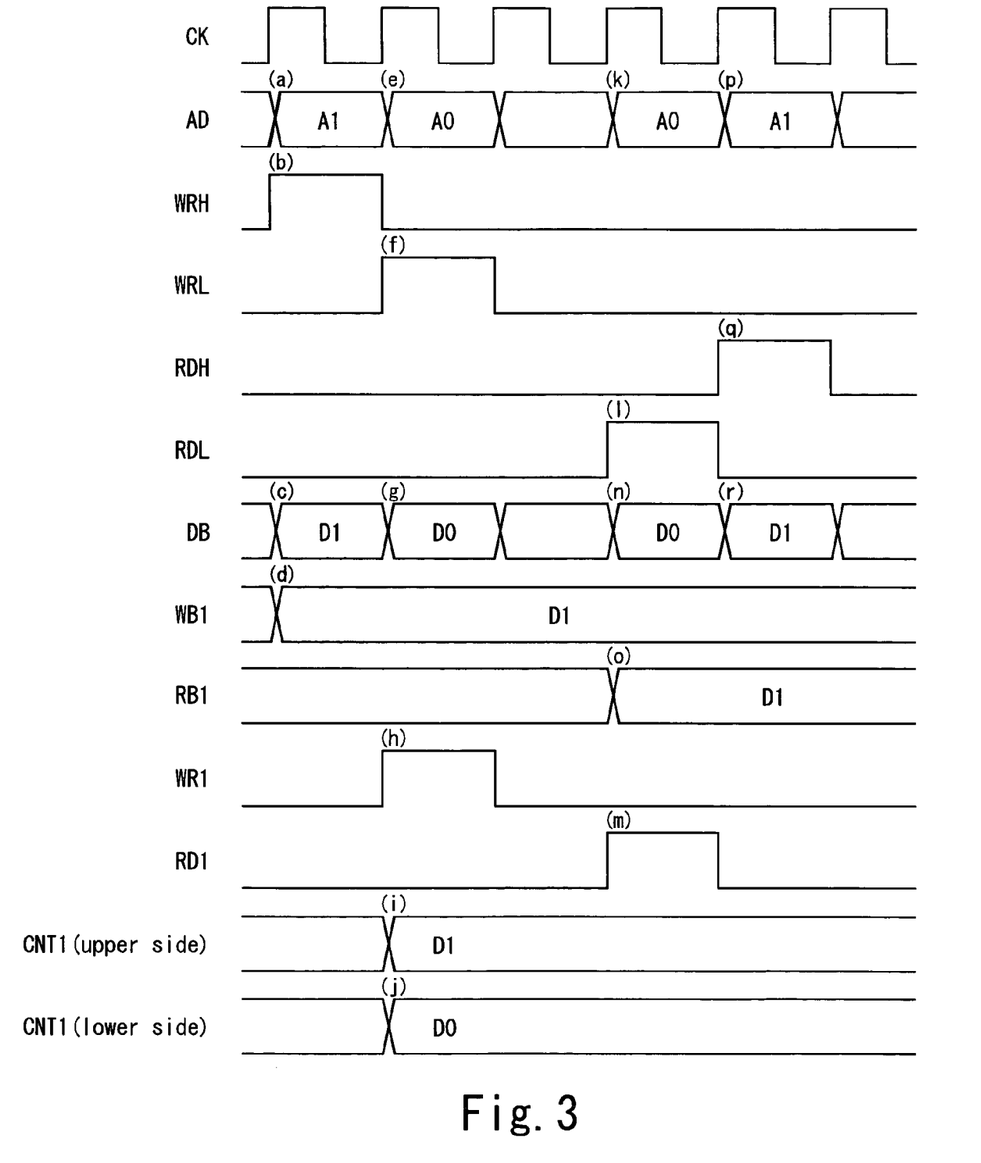
FIG. 3 is a timing chart showing an example of an access operation in accordance with the first embodiment.

FIG. 3 shows an example of an access operation in the first embodiment. In FIG. 3, a clock CK indicates an operating clock of the system LSI 10. That is, the CPU 12 and the timer 14 operate in synchronization with the clock CK. Although this example shows an access operation of the CPU 12 to the counter CNT1, an access operation of the CPU 12 to the counter CNT2 is the same as the access operation of the CPU 12 to the counter CNT1.

To make a 16-bit write access to the counter CNT1, the CPU 12 sets the address signal AD to a level indicating an address A1 of an upper side of the counter CNT1 and at the same time activates the write signal WRH, and outputs the write data D1 to the data bus DB ((a), (b) and (c) in FIG. 3). The write buffer WB1 then takes the data D1 of the data bus DB ((d) in FIG. 3). At this time, the buffer status flag BSF1 is set. That is, the selector circuit SEL1 selects the data D1 outputted from the write buffer WB1 and outputs the data D1 to the upper side of the counter CNT1.

Then, the CPU 12 sets the address signal AD to a level indicating an address A0 of a lower side of the counter CNT1 and at the same time activates the write signal WRL, and outputs the write data D0 to the data bus DB ((e), (f) and (g) in FIG. 3). At this time, the internal write signal WR1 is activated ((h) in FIG. 3). Accordingly, the counter CNT1 takes the data D1 outputted from the selector circuit SEL1 on the upper side and at the same time takes the data D0 of the data bus DB on the lower side ((i) and (j) in FIG. 3). Accordingly, 16-bit data consisting of 8-bit data D0 and D1 can be written to the counter CNT1 at the same timing.

Next, to make a 16-bit read access to the counter CNT1, the CPU 12 sets the address signal AD to the level indicating the address A0 of the lower side of the counter CNT1 and at the same time activates the read signal RDL ((k) and (I) in FIG. 3). At this time, the internal read signal RD1 is activated ((m) in FIG. 3). Accordingly, the counter CNT1 outputs the data D0 of the lower side to the data bus DB as read data ((n) in FIG. 3). At the same time, the counter CNT1 outputs the data D1 of the upper side to the read buffer RB1 and the read buffer RB1 takes the data D1 of the upper side of the counter CNT1 ((o) in FIG. 3).

Sequentially, The CPU 12 sets the address signal AD to the level indicating the address of the upper side of the counter CNT1 and at the same time activates the read signal RDH ((p) and (q) in FIG. 3). Accordingly, the read buffer RB1 outputs the data D1 to the data bus DB as read data ((r) in FIG. 3). The CPU 12 takes the 8-bit data D0 and D1 from the data bus DB sequentially so that it can take 16-bit data read from the counter CNT1 in the same timing.

According to the first embodiment, since the lower side of the counter CNTn is directly connected to the data bus DB, an access operation of the CPU 12 to only the lower side of the counter CNTn can be implemented at the same timing as a timer including a counter having the same data width as the data bus DB (i.e., 8-bit counter). Also, in a case where the CPU 12 makes write access to only the lower side of the counter CNTn, the data ALL1 is written to the upper side of the counter CNTn when the counter CNTn counts up, and the data ALL0 is written to the upper side of the counter CNTn when the counter CNTn counts down, so that the 16-bit counter CNTn can be operated equivalent to the 8-bit counter. Accordingly, it is possible to employ an existing test pattern for a timer having the 8-bit counter, as it is, to test the timer 14. Further, when there is a need to make access to only the lower side of the counter CNTn, it is not necessary to make access both to the upper side and to the lower side of the counter CNTn, thus preventing a waste of access time.

Figure 4:
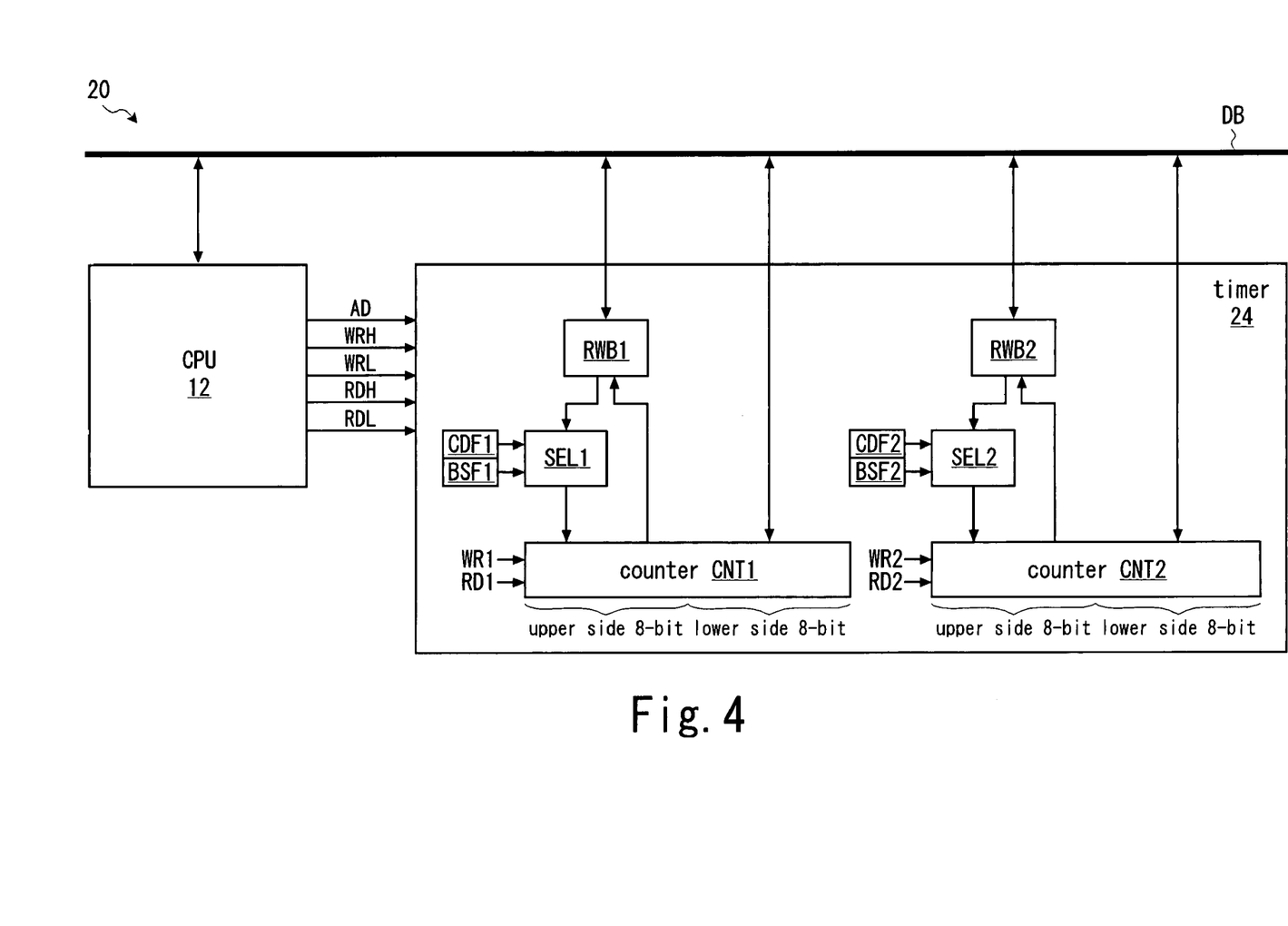
FIG. 4 is a block diagram showing a second embodiment of the invention.

FIG. 4 shows a second embodiment of the invention. In the second embodiment, the same elements as those of the first embodiment are denoted by the same reference numerals and the detail description thereof will be omitted. A system LSI 20 is the same as the system LSI 10 of the first embodiment except that a timer 24 replaces the timer 14 of the first embodiment (FIG. 1). The timer 24 is the same as the timer 14 except that the timer 24 has read/write buffers RWBn (combined buffers) instead of the write buffer WBn and read buffer RBn in the first embodiment.

When the address signal AD represents the address of the upper side of the counter CNTn and the write signal WRH is activated, the read/write buffer RWBn takes data of the data bus DB and outputs it to the selector circuit SELn. When the address signal AD represents the address of the lower side of the counter CNTn and the read signal RDL is activated, the read/write buffer RWBn takes data outputted from the lower side of the counter CNTn. When the address signal AD represents the address of the upper side of the counter CNTn and the read signal RDH is activated, the read/write buffer RWBn outputs the taken data to the data bus DB. That is, the read/write buffer RWBn realizes both functions of the write buffer WBn and the read buffer RBn of the first embodiment.

Although the read/write buffer RWBn is provided instead of the write buffer WBn and the read buffer RBn of the first embodiment, the access operation of the CPU 12 to the counter CNTn is normally performed since a conflict between the write access and read access of the CPU 12 does not occur. Accordingly, it is possible to obtain the same effect in the second embodiment as in the first embodiment. Further, the read/write buffer RWBn realizes both functions of the write buffer WBn and the read buffer RBn of the first embodiment, thereby reducing the circuit scale of the timer 24 compared to the timer 14 of the first embodiment.

Figure 5:
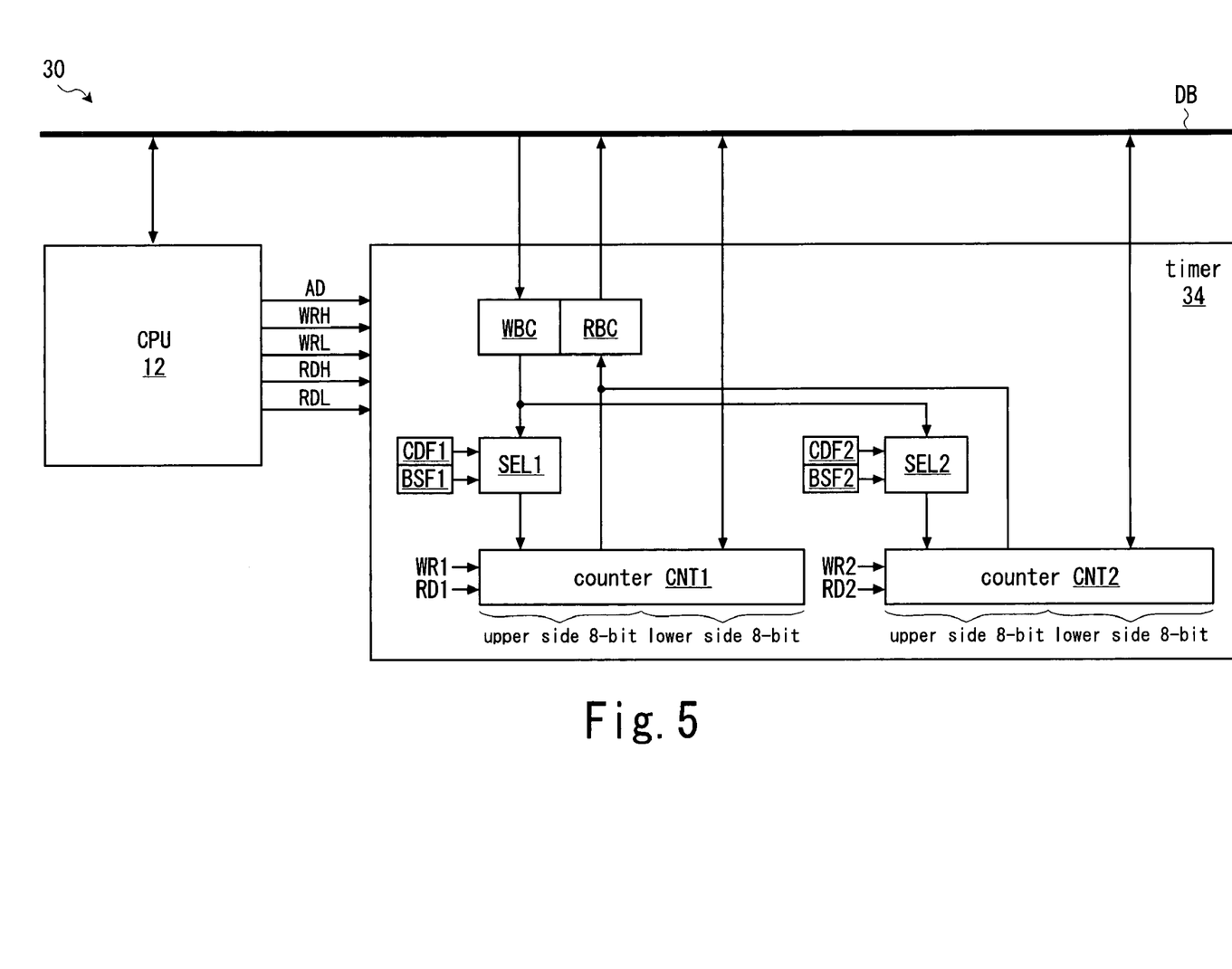
FIG. 5 is a block diagram showing a third embodiment of the invention.

FIG. 5 shows a third embodiment of the present invention. In the third embodiment, the same elements as those of the first embodiment are denoted by the same reference numerals and the detail description thereof will be omitted. A system LSI 30 is the same as the system LSI 10 of the first embodiment except that the timer 14 of the first embodiment (FIG. 1) is replaced with a timer 34. The timer 34 is the same as the timer 14 except that the write buffers WBn and the read buffers RBn in the first embodiment are replaced with a common write buffer WBC and a common read buffer RBC.

When the address signal AD represents the address of the upper side of any one of the counters CNT1 and CNT2 and the write signal WRH is activated, the common write buffer WBC takes data of the data bus DB and outputs it to the selector circuits SEL1 and SEL2. That is, the common write buffer WBC realizes both functions of the write buffers WB1 and WB2 of the first embodiment, and is commonly provided to the counters CNT1, CNT2.

The common read buffer RBC takes data outputted from the lower side of the counter CNT1 (or counter CNT2) when the address signal AD indicates the address of the lower side of the counter CNT1 (or counter CNT2) and the read signal RDL is activated. The common read buffer RBC outputs the taken data to the data bus DB when the address signal AD indicates the address of the upper side address of the counter CNT1 (or counter CNT2) and the read signal RDH is activated. That is, the common read buffer RBC realizes both functions of the read buffers RB1 and RB2 of the first embodiment, and is commonly provided to the counters CNT1, CNT2.

Although the common write buffer WBC and the common read buffer RBC is provided instead of the write buffers WBn and the read buffers RBn of the first embodiment, the access operation of the CPU 12 to the counter CNTn is normally performed since a conflict between accesses of the CPU 12 to the counter CNT1 and CNT2 does not occur. Accordingly, it is possible to obtain the same effect in the third embodiment as in the first embodiment. Further, the common write buffer WBC realizes both functions of the write buffers WB1 and WB2 of the first embodiment and the common read buffer RBC realizes both functions of the read buffers RB1 and RB2 of the first embodiment, thereby reducing the circuit scale of the timer 34 compared to the timer 14 of the first embodiment.

Figure 6:
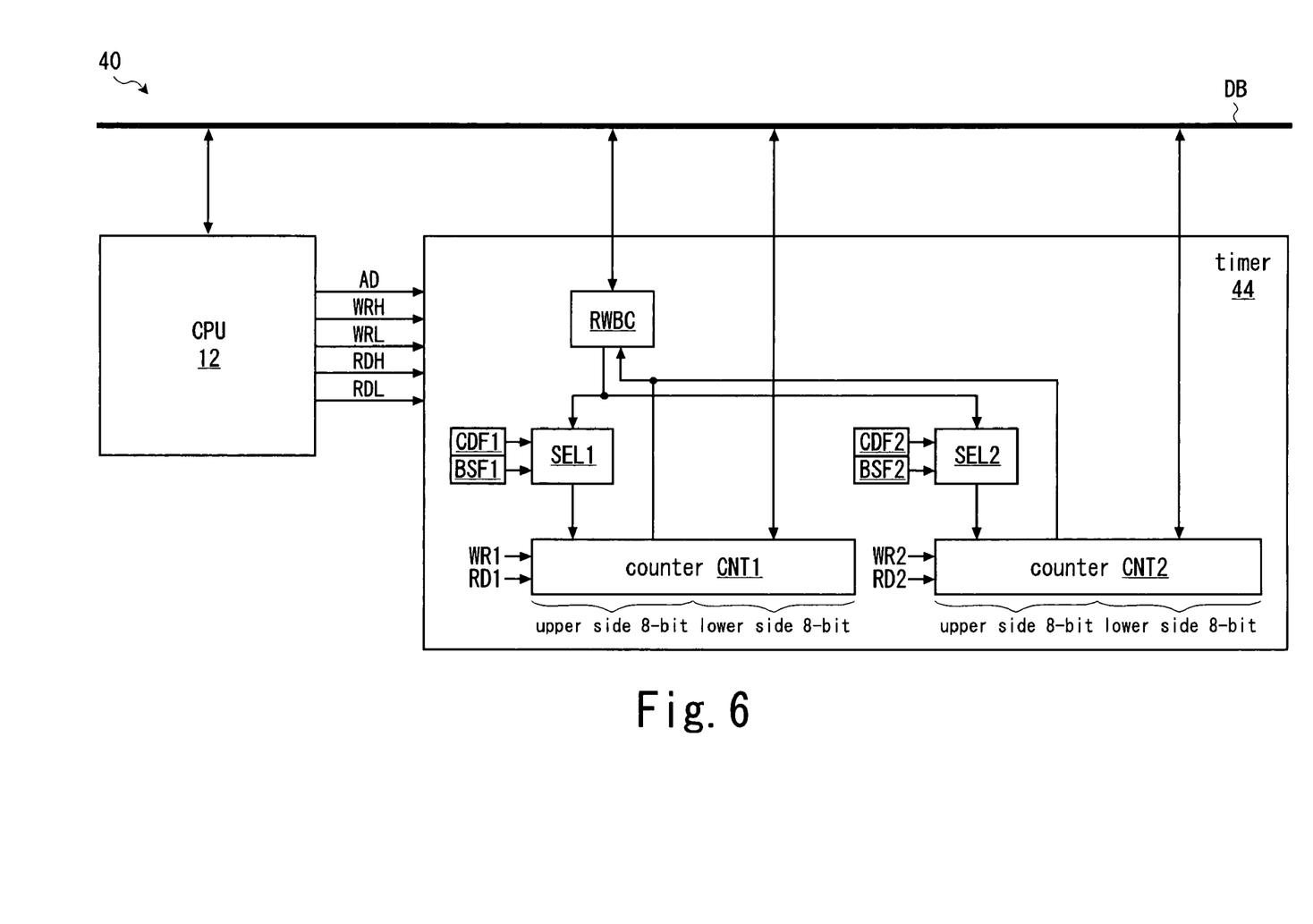
FIG. 6 is a block diagram showing a fourth embodiment of the invention.

FIG. 6 shows a fourth embodiment of the invention. In the fourth embodiment, the same elements as those of the first and third embodiments are denoted by the same reference numerals and the detail description thereof will be omitted. A system LSI 40 is the same as the system LSI 30 of the third embodiment (FIG. 5) except that the timer 34 of the third embodiment is replaced with a timer 44. The timer 44 is the same as the timer 34 of the third embodiment except that the common write buffer WBC and the common read buffer RBC in the third embodiment are replaced with a common read/write buffer RWBC (combined buffers).

When the address signal AD represents the address of the upper side of any one of the counters CNT1 and CNT2 and the write signal WRH is activated, the common read/write buffer RWBC takes data of the data bus DB and outputs it to the selector circuits SEL1 and SEL2. The common read/write buffer RWBC takes data outputted from the lower side of the counter CNT1 (or counter CNT2) when the address signal AD indicates the address of the lower side of the counter CNT1 (or counter CNT2) and the read signal RDL is activated. The common read/write buffer RWBC outputs the taken data to the data bus DB when the address signal AD indicates the address of the upper side of the counter CNT1 (or counter CNT2) and the read signal RDH is activated. That is, the common read/write buffer RWBC realizes both functions of the common write buffer WBC and the common read buffer RBC of the third embodiment. In other words, the common read/write buffer RWBC realizes all functions of the write buffers WB1 and WB2, and the read buffers RB1 and RB2 of the first embodiment.

Although the common read/write buffer RWBC is provided instead of the common write buffer WBC and the common read buffer RBC of the third embodiment, the access operation of the CPU 12 to the counter CNTn is normally performed such that a conflict between the write access and the read access of the CPU 12, as well as a conflict between accesses of the CPU 12 to the counter CNT1 and CNT2, does not occur. Accordingly, it is possible to obtain the same effect in the fourth embodiment as in the first embodiment. Further, the common read/write buffer RWBC realizes all functions of the write buffers WB1 and WB2, and the read buffers RB1 and RB2 of the first embodiment, thereby reducing the circuit scale of the timer 44 compared to the timer 34 of the third embodiment.

Figure 7:
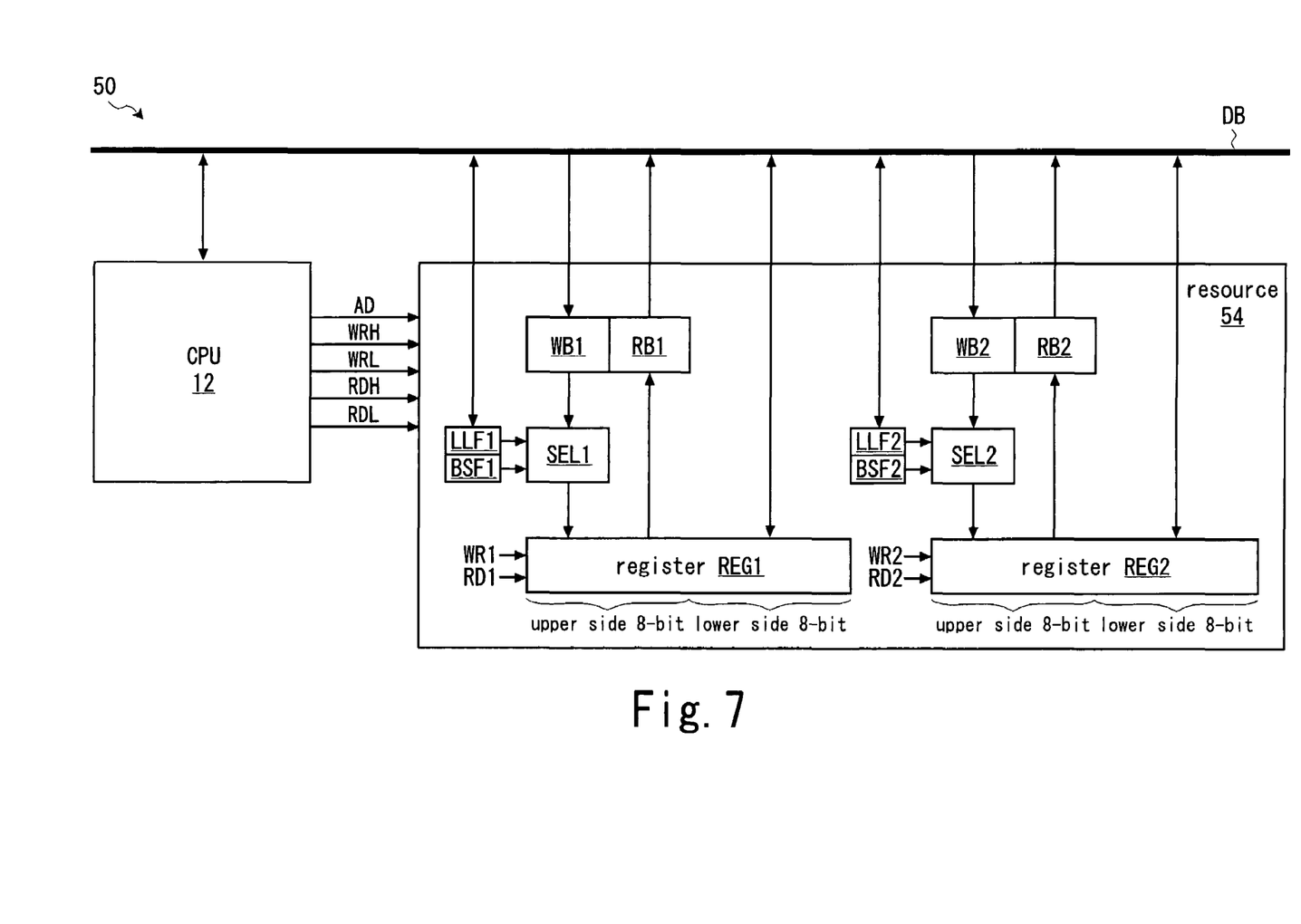
FIG. 7 is a block diagram showing a fifth embodiment of the invention.

FIG. 7 shows a fifth embodiment of the invention. In the fifth embodiment, the same elements as those of the first embodiment are denoted by the same reference numerals and the detail description thereof will be omitted. A system LSI 50 is the same as the LSI 10 of the first embodiment (FIG. 1) except that the timer 14 of the first embodiment is replaced with a resource 54.

The resource 54 includes write buffers WBn, buffer status flags BSFn, logic level flags LLFn (second storing circuits), selector circuits SELn, 16-bit registers REGn, and read buffers RBn. The logic level flag LLFn consists of, for example, a single register. When the address signal AD indicates an address assigned to the register and the write signal WRL is activated, the logic level flag LLFn takes data of the corresponding bits on the data bus DB. When the address signal AD represents an address assigned to the register and the read signal RDL is activated, the logic level flag LLFn outputs data to the corresponding bits on the data bus DB.

The logic level flag LLFn is set when the CPU 12 writes data "1" via the data bus DB, and is reset when the CPU 12 writes data "0" via the data bus DB. Accordingly, the logic level flag LLFn represents either "logic 1" or "logic 0". The register REGn is the same as the counter CNTn of the first embodiment except that it does not have a counter function.

Accordingly, it is possible to obtain the same effect in the fifth embodiment as in the first embodiment. In addition, when the CPU 12 makes write access to only the lower side of the register REGn, data to be written to the upper side of the register REGn can be determined. Accordingly, in a test of making the resource 54 perform a desired operation, it is possible to prevent different data from being written to the upper side of the register REGn each time the test is performed, thereby allowing the resource 54 to perform a desired operation each time. Also, the set/reset status of the logic level flag LLFn can be set by the write access of the CPU 12. Accordingly, when the CPU 12 makes write access to only the lower side of the register REGn, data to be written to the upper side of the register REGn can be changed according to the type or use of the register REGn.

Although the present invention has been applied to the access operation of the CPU in the first to fifth embodiments, the present invention is not limited to the above-mentioned embodiments. For example, the present invention may be applied to an access operation (i.e., data transfer between a memory and a register) of a DMA (direct memory access) controller.

Although the CPU 12 activates the read signal RDH upon access to the upper side of the counter CNTn (or register REGn) and activates the read signal RDL upon access to the lower side of the counter CNTn (or register REGn) in the above-mentioned first to fifth embodiments, the present invention is not limited to the above-mentioned embodiments. For example, when the CPU 12 accesses either the upper side or the lower side of the counter CNTn (or register REGn), the CPU 12 may be allowed to activate a single read signal.

The invention is not limited to the above embodiments and various modifications may be made without departing from the spirit and scope of the invention. Any improvement may be made in part or all of the components.

What is claimed is:

1. A semiconductor integrated circuit comprising:
   a data bus;
   a bus master which performs an access operation in a data width same as that of said data bus; and
   a macro block which has a data width larger than said data bus and includes a register whose lower side is connected to said data bus, a write buffer storing therein write data to an upper side of said register, and a read buffer storing read data from the upper side of said register, wherein:
   said bus master accesses a lower side of said register last when needing to make write accesses to both of the upper and lower sides of said register, and said bus master accesses the lower side of said register first when needing to make read accesses to both of the upper and lower sides of said register;
   said macro block stores data of said data bus in said write buffer in response to a write access of said bus master to the upper side of said register, and writes the data of said data bus to the lower side of said register and writes the data of said write buffer to the upper side of said register in response to a write access of said bus master to the lower side of said register; and
   said macro block reads and outputs the data of the lower side of said register to said data bus and reads and stores the data of the upper side of said register in said read buffer in response to a read access of said bus master to the lower side of said register, and outputs the data of said read buffer to said data bus in response to a read access of said bus master to the upper side of said register.

2. The semiconductor integrated circuit of claim 1, wherein said macro block includes a combined buffer to function as both of said write buffer and said read buffer.

3. The semiconductor integrated circuit of claim 1, wherein said macro block includes a plurality of the registers, and said write buffer and said read buffer commonly provided to said plurality of registers.

4. The semiconductor integrated circuit of claim 3, wherein said macro block includes a combined buffer to function as both said write buffer and said read buffer.

5. The semiconductor integrated circuit of claim 1, wherein said macro block includes:
- a first storing circuit which indicates whether or not said bus master has made a write access to the upper side of said register;
- a second storing circuit which indicates either logic 1 or logic 0; and
- a selection circuit which selects data of said write buffer for output when said first storing circuit indicates that write access has been made, and which selects, according to a logic indicated by said second storing circuit, either first reserve data or second reserve data for output as data of said write buffer when said first storing circuit indicates that no write access has been made, the first reserve data whose all of bits indicate logic 1, the second reserve data whose all of bits indicate logic 0.

6. The semiconductor integrated circuit of claim 5, wherein said first storing circuit makes a transition into a state indicating that write access has been made when said bus master accesses the upper side of said register, and makes a transition into a state indicating that no write access has been made when said bus master accesses the lower side of said register.

7. The semiconductor integrated circuit of claim 5, wherein said second storing circuit is a register accessed by said bus master.

8. The semiconductor integrated circuit of claim 1, wherein said macro block includes:
- said register functioning as a counter;
- a first storing circuit which indicates whether or not said bus master has made a write access to the upper side of said register;
- a second storing circuit which indicates a count direction of said register; and
- a selection circuit which selects data of said write buffer for output when said first storing circuit indicates that write access has been made, and which selects, according to a count direction indicated by said second storing circuit, either first reserve data or second reserve data for output as the data of said write buffer when said first storing circuit indicates that no write access has been made, the first reserve data whose all bits indicate logic 1, the second reserve data whose all bits indicate logic 0.

9. The semiconductor integrated circuit of claim 8, wherein when said first storing circuit indicates that no write access has been made, said selection circuit selects said first reserve data if said second storing circuit indicates that said register is counting up, and said selection circuit selects said second reserve data if said second storing circuit indicates that said register is counting down.

10. The semiconductor integrated circuit of claim 8, wherein
said first storing circuit makes a transition into a state indicating that write access has been made when said bus master accesses the upper side of said register, and makes a transition into a state indicating that no write access has been made when said bus master accesses the lower side of said register.

* * * * *